United States Patent
Au Yeung et al.

(10) Patent No.: US 10,079,660 B2
(45) Date of Patent: Sep. 18, 2018

(54) SYSTEM AND METHOD OF TRACKING AND COMPENSATING FOR FREQUENCY AND TIMING OFFSETS OF MODULATED SIGNALS

(71) Applicant: Samsung Electronics Co., Ltd., Suwon-si, Gyeonggi-do (KR)

(72) Inventors: Chun Kin Au Yeung, San Diego, CA (US); Farrokh Etezadi, San Diego, CA (US); Xiaoqiang Ma, San Diego, CA (US); Linbo Li, San Diego, CA (US); Kee-Bong Song, San Diego, CA (US)

(73) Assignee: Samsung Electroncis Co., Ltd. (KR)

( * ) Notice: Subject to any disclaimer, the term of this patent is extended or adjusted under 35 U.S.C. 154(b) by 0 days.

(21) Appl. No.: 15/433,859

(22) Filed: Feb. 15, 2017

(65) Prior Publication Data
US 2018/0212724 A1   Jul. 26, 2018

Related U.S. Application Data

(60) Provisional application No. 62/450,268, filed on Jan. 25, 2017.

(51) Int. Cl.
*H04L 1/24* (2006.01)
*H04L 27/156* (2006.01)
(Continued)

(52) U.S. Cl.
CPC ............ *H04L 1/242* (2013.01); *H04L 27/156* (2013.01); *H04L 27/2337* (2013.01); *H04L 43/16* (2013.01); *H04L 61/6081* (2013.01)

(58) Field of Classification Search
CPC ... H04L 1/242; H04L 27/156; H04L 27/2337; H04L 43/16; H04L 61/6081
(Continued)

(56) References Cited

U.S. PATENT DOCUMENTS

| | | | | | |
|---|---|---|---|---|---|
| 4,312,075 A | * | 1/1982 | Murano | ................ | H04L 7/0334 327/78 |
| 5,164,965 A | * | 11/1992 | Karaali | ................ | H04L 7/0331 375/355 |

(Continued)

OTHER PUBLICATIONS

Chen et al., "A 2.4 GHz Reference-Less Receiver for 1 Mbps QPSK Demodulation," IEEE Transactions on Circuits and Systems—I: Regular Papers, vol. 59, No. 3, Mar. 2012, (pp. 505-514).
(Continued)

*Primary Examiner* — Zewdu Kassa
(74) *Attorney, Agent, or Firm* — Innovation Counsel LLP (57) ABSTRACT

According to an embodiment of the present disclosure, a receiver of modulated signals comprises a signal sampling unit configured to sample a signal, a zero-crossing demodulator, and a timing offset tracking unit. The zero-crossing demodulator includes: a zero-crossing counter configured to determine a number of zero crossings for each pulse of the signal, and a symbol selector configured to decode a sequence of pulses as a symbol based on the number of zero crossings in the sequence of pulses. The timing offset tracking unit is configured to: calculate a metric based on an accumulation of the number of zero crossings and corresponding pulse values of the decoded symbol, compare the metric to a predetermined threshold value, and compensate a timing offset of the signal by causing the signal sampling unit to sample the signal at an earlier interval or a later interval in response to the comparison.

20 Claims, 4 Drawing Sheets

(51) Int. Cl.
*H04L 27/233* (2006.01)
*H04L 12/26* (2006.01)
*H04L 29/12* (2006.01)

(58) Field of Classification Search
CPC ..... H04L 27/2647; H04L 1/20; H04N 5/4401; H04B 1/30; H04B 1/28
USPC ................ 375/226, 225, 224, 316, 295, 219
See application file for complete search history.

(56) References Cited

U.S. PATENT DOCUMENTS

| | | | |
|---|---|---|---|
| 6,044,118 A * | 3/2000 | Schetelig | H04L 27/2332 375/344 |
| 7,564,926 B2 * | 7/2009 | Neubauer | H04L 27/2337 375/322 |
| 8,731,029 B1 | 5/2014 | Wu et al. | |
| 9,478,969 B2 | 10/2016 | Beck et al. | |
| 2017/0180170 A1 * | 6/2017 | Purushothaman | H04L 27/06 |

OTHER PUBLICATIONS

Park et al., "Short-Range Wireless Communications for Next-Generation Networks: UWB, 60 GHz Millimeter-Wave WPAN, and ZigBee," IEEE Wireless Communications, Aug. 2007, (pp. 70-78).
Spiegel et al., "Impact of Frequency Offsets on Zero Crossing Demodulation based Receivers," Applied Sciences in Biomedical and Communication Technologies (ISABEL), 2010 3rd International Symposium, IEEE, 2010, (pp. 1-5).

* cited by examiner

SYSTEM AND METHOD OF TRACKING AND COMPENSATING FOR FREQUENCY AND TIMING OFFSETS OF MODULATED SIGNALS

CROSS-REFERENCE TO RELATED APPLICATIONS

This application claims priority to and the benefit of U.S. Provisional Patent Application No. 62/450,268, titled "APPARATUS AND METHOD FOR ROBUST TIMING AND FREQUENCY OFFSET TRACKING OF RECEIVERS WITH PHASE SHIFT KEYING (PSK) MODULATION" and filed on Jan. 25, 2017, the entire content of which is incorporated herein by reference.

RELATED FIELD

The present disclosure relates to wireless communications systems. In particular, the present disclosure relates to a system and method of tracking and compensating frequency and timing offsets of modulated signals.

BACKGROUND

In a baseband wireless modem design, symbol timing and initial frequency offsets are often accounted for during initial signal acquisition. However, due to differences between transmitter and receiver clock frequencies, timing and frequency errors may continue to accumulate over the duration of a data packet transfer. For longer packets, the uncorrected timing and frequency offsets accumulated throughout the packet transfer may severely degrade the receiver performance.

For example, according to the IEEE 802.15.4 specification, which is a basis for ZigBee's specification, the OQPSK physical layer (PHY) symbol rate is 25 ksymbol/s when operating in the 868 MHz band and 62.5 ksymbol/s when operating in the 780 MHz, 915 MHz, or 2450 MHz band with an accuracy of ±40 parts per million (ppm). OQPSK stands for offset quadrature phase-shift keying. ZigBee's OQPSK is a form of continuous phase frequency shift keying (CPFSK) modulation in which the instantaneous frequency is binary $f_k=\pm\Delta f$, whereas the instantaneous frequency for CPFSK generally may be $f_k=\pm\Delta f, \pm3\Delta f, \ldots$. Under CPFSK, each symbol has a fixed duration, and the phase from one symbol to a subsequent symbol maintains continuity.

If the transmit clock and receive clock have an accuracy within 40 ppm but in opposite direction, it is equivalent to the receiver experiencing 80 ppm offset. Hence, the maximum frequency offset possible is about 2.4 GHz*80/1M=192 kHz or just about 200 kHz. In addition, the maximum PSDU size is 128 octets, which is equivalent to 256 symbols and 8192 chips (a chip generally refers to a pulse of a direct-sequence spread spectrum (DSSS) code). Thus, in this extreme case, the total timing drift by the end of the packet is 8192 chips*80/1e6~0.66 chips. An offset of more than half a chip can be devastating to the OQPSK demodulation performance.

SUMMARY

According to an embodiment of the present disclosure, a receiver of modulated signals comprises a signal sampling unit configured to sample a signal, a zero-crossing demodulator, and a timing offset tracking unit. The zero-crossing demodulator includes: a zero-crossing counter configured to determine a number of zero crossings for each pulse of the signal, and a symbol selector configured to decode a sequence of pulses as a symbol based on the number of zero crossings in the sequence of pulses. The timing offset tracking unit is configured to: calculate a metric based on an accumulation of the number of zero crossings and corresponding pulse values of the decoded symbol, compare the metric to a predetermined threshold value, and compensate a timing offset of the signal by causing the signal sampling unit to sample the signal at an earlier interval or a later interval in response to the comparison.

According to another embodiment of the present disclosure, a receiver of modulated signals comprises: a signal mixer configured to perform baseband down-conversion of a signal according to a mixer frequency, a zero-crossing demodulator, and a frequency offset tracking unit. The zero-crossing demodulator includes: a zero-crossing counter configured to determine a number of zero crossings for each pulse of the signal, and a symbol selector configured to decode a sequence of pulses as a symbol based on the number of zero crossings in the sequence of pulses. The frequency offset tracking unit is configured to: calculate a frequency offset based on an accumulation of the number of zero crossings, and compensate a frequency offset of the signal by causing the signal mixer unit to increase or decrease the mixer frequency according to the calculated frequency offset.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide the present system and method. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

The present system and method of tracking and compensating for timing and frequency offsets are applicable to wireless communication systems including, but not limited to, ZigBee, IEEE 802.15.4, and OQPSK communications systems. In general, the present system and method provide data-aided timing offset (TO) and frequency offset (FO) tracking where no known sequence (e.g., preamble) is present.

According to one embodiment, the present system and method provide a low-complexity timing and frequency offset tracking technique based on the output of zero-crossing counters. Low complexity is achieved because zero-crossing counters are generally already implemented as part of the demodulation scheme for ZigBee. Thus, by reusing the demodulation outputs for TO and FO tracking, less circuitry may be required. Furthermore, by exploiting the basic properties of chip distribution, the present system and method provide a TO metric and a FO metric that are used to determine timing and frequency offset compensation.

Figure 1:
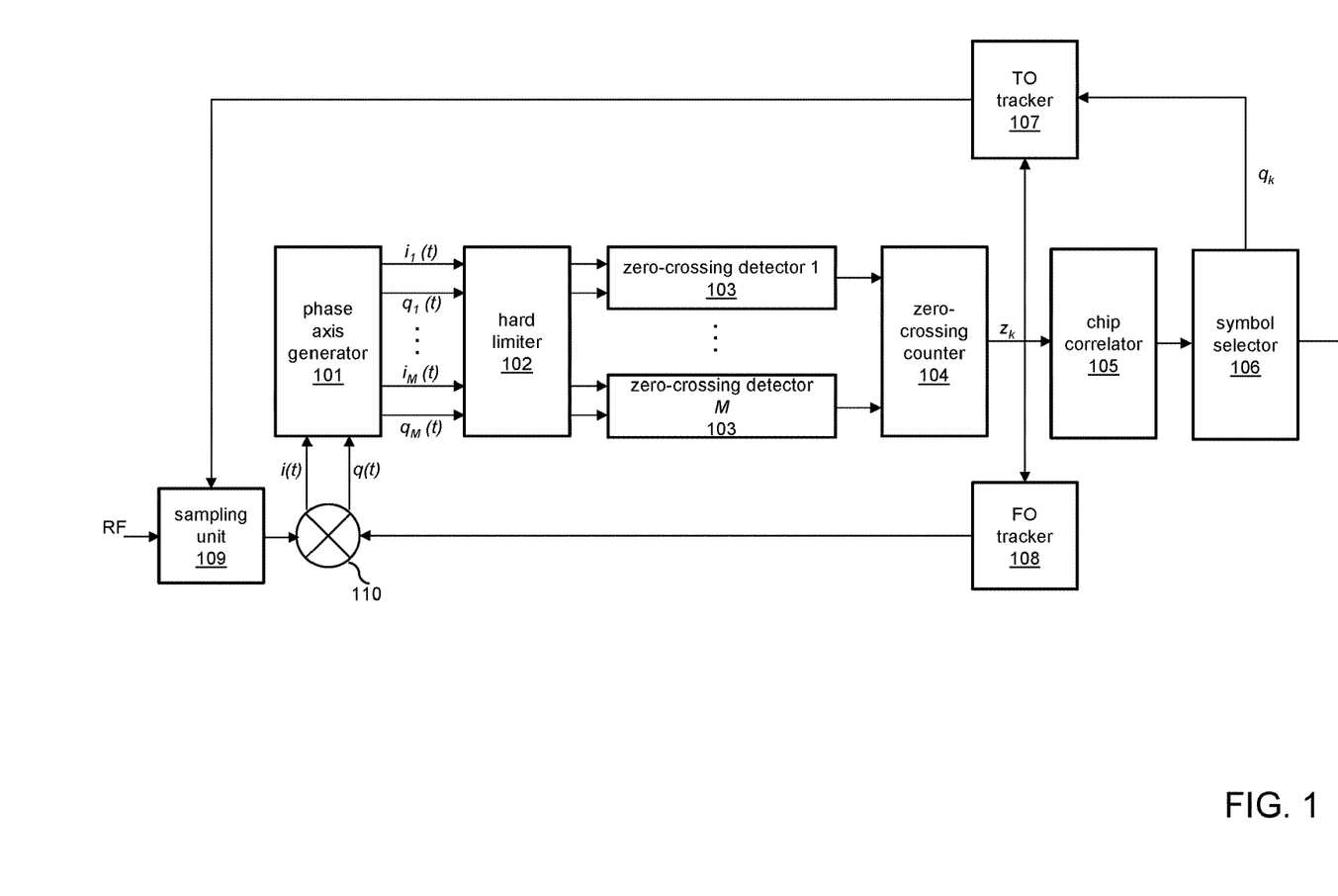
FIG. 1 illustrates an exemplary diagram of a zero-crossing demodulator (ZCD), a timing offset tracking unit and a frequency offset tracking unit, according to an embodiment.

FIG. 1 illustrates an exemplary diagram of a zero-crossing demodulator (ZCD), a timing offset tracking unit and a frequency offset tracking unit, according to an embodiment. The ZCD includes a phase axis generator 101, a hard limiter 102, one or more zero-crossing detectors 103, a zero-crossing counter 104, a chip correlator 105, and a symbol selector 106. Although FIG. 1 shows these components as separate components, one or more of these components may be combined.

The phase axis generator 101 receives in-phase and quadrature-phase components of a down-converted OQPSK signal, i.e., i(t) and q(t) from a digital signal mixer 110, which is configured to perform baseband down-conversion of a sampled signal (e.g., an RF signal in the case of a zero-IF receiver) according to a mixer frequency. The phase axis generator 101 generates M phase axes:

$$i_m(t) = i(t)\cos(\theta_m) + q(t)\sin(\theta_m)$$

$$q_m(t) = -i(t)\sin(\theta_m) + q(t)\cos(\theta_m)$$

form $\in \{1, \ldots, M\}$. That is, the phase axis generator 101 performs Park transformation on the signal components to generate a plurality of transformed signals each with respect to a different set of phase axes, and the number of zero crossings for each pulse is determined as a sum of zero crossings over the plurality of transformed signals. Two summers and two scalers with i(t) and q(t) may be required for any phase axis pair. It is considered that $\theta_m$, $m \in \{1, \ldots, M\}$ are uniformly spaced in the interval $$\left[0, \frac{\pi}{2}\right).$$

The hard limiter 102 performs a function as follows for input x:

$$\hat{f}(x) = \begin{cases} 1, & x \geq 0 \\ -1, & x < 0 \end{cases}$$

Each zero-crossing detector 103 takes a pair of signals, $i_m(t)$ and $q_m(t)$, from the phase axis generator output, and detects zero-crossings (i.e., phase axis-crossing time points) and the phase-rotation direction of each crossing. If the $i_m(t)$ signal changes value from positive to negative and the value of $q_m(t)$ at the crossing time is negative, then the m-th zero-crossing detector 103 generates a negative pulse at the crossing time to indicate that the estimated phase rotation is in a clockwise direction, and vice versa. The output of the m-th zero-crossing detector 103 employing $i_m(t)$ and $q_m(t)$, denoted by $D_m(t)$, can be written as:

$$D_m(t) = \frac{1}{2}(\hat{i}_m(t)(\hat{q}_m(t) - \hat{q}_m(t-1)) - \hat{q}_m(t)(\hat{i}_m(t) - \hat{i}_m(t-1))) =$$

$$\frac{1}{2}(\hat{i}_m(t-1)\hat{q}_m(t) - \hat{i}_m(t)\hat{q}_m(t-1))$$

where t refers to the sample index. The output $D_m(t)$ of the m-th zero-crossing detector belongs to the set $\{-1, 0, 1\}$. In particular, $-1$, 0 and 1 are mapped to clockwise crossing, no crossing, and counter clockwise crossing, respectively.

At the start of any OQPSK symbol, i.e., the beginning of each chip duration Tc, the zero-crossing counter is reset to zero. The zero-crossing counter 104 keeps adding the outputs of the zero-crossing detectors 103, and generates the summation result at the end of the symbol as the output. In particular, consider an oversampling of OSR samples per chip. The total number of OSR×M samples associated with chip index k is as follows:

$$z_k = \sum_{t=0}^{OSR-1} \sum_{m=1}^{M} D_m(t, k)$$

where $D_m(t, k)$ is the zero-crossing count of sample t phase axis m during chip k. The summation result $z_k$ is the total count of zero crossings per chip, summed over all the samples and phase axes over the chip duration, and is fed into the chip correlator 105. Thus, the zero-crossing counter determines a total number of zero crossings for each chip or pulse. A higher magnitude of $z_k$ corresponds to a higher confidence that a first sample transitioned to a second sample in a particular direction.

A chip generally refers to a pulse of a direct-sequence spread spectrum (DSSS) code. For example, each data symbol of a signal may be mapped into one of sixteen 32-chip pseudo-random noise (PN) sequences, such as specified in Table below. The PN sequences are related to each other through cyclic shifts and/or conjugation (i.e., inversion of odd-indexed chip values).

TABLE 1

Example Symbol-to-Chip mapping

| Data Symbol | Chip Values ($c_0 c_1 \ldots c_{30} c_{31}$) |
|---|---|
| 0 | 1 1 0 1 1 0 0 1 1 1 0 0 0 0 1 1 0 1 0 1 0 0 1 0 0 0 1 0 1 1 1 0 |
| 1 | 1 1 1 0 1 1 0 1 1 0 0 1 1 1 0 0 0 0 1 1 0 1 0 1 0 0 1 0 0 0 1 0 |
| 2 | 0 0 1 0 1 1 1 0 1 1 0 1 1 0 0 1 1 1 0 0 0 0 1 1 0 1 0 1 0 0 1 0 |
| 3 | 0 0 1 0 0 0 1 0 1 1 1 0 1 1 0 1 1 0 0 1 1 1 0 0 0 0 1 1 0 1 0 1 |
| 4 | 0 1 0 1 0 0 1 0 0 0 1 0 1 1 1 0 1 1 0 1 1 0 0 1 1 1 0 0 0 0 1 1 |
| 5 | 0 0 1 1 0 1 0 1 0 0 1 0 0 0 1 0 1 1 1 0 1 1 0 1 1 0 0 1 1 1 0 0 |
| 6 | 1 1 0 0 0 0 1 1 0 1 0 1 0 0 1 0 0 0 1 0 1 1 1 0 1 1 0 1 1 0 0 1 |
| 7 | 1 0 0 1 1 1 0 0 0 0 1 1 0 1 0 1 0 0 1 0 0 0 1 0 1 1 1 0 1 1 0 1 |
| 8 | 1 0 0 0 1 1 0 0 1 0 0 1 0 1 1 0 0 0 0 0 0 1 1 1 0 1 1 1 1 0 1 1 |
| 9 | 1 0 1 1 1 0 0 0 1 1 0 0 1 0 0 1 0 1 1 0 0 0 0 0 0 1 1 1 0 1 1 1 |

TABLE 1-continued

Example Symbol-to-Chip mapping

| Data Symbol | Chip Values ($c_0 c_1 \ldots c_{30} c_{31}$) |
|---|---|
| 10 | 01111011100011001001011000000111 |
| 11 | 01110111101110001100100101100000 |
| 12 | 00000111101111011000110010010110 |
| 13 | 01100000011101111011100011001001 |
| 14 | 10010110000011101111011100011000 |
| 15 | 11001001011000001110111101111000 |

The term "chip" and "pulse" are used interchangeably herein for convenience of description. Although the chip values in Table 1 are shown as having a value of 0 or 1, the chip values may alternatively have a value of −1 or 1, depending on usage.

The chip correlator 105 provides one of a hard chip correlation and a soft chip correlation, and the symbol selector 106 decodes a sequence of the chips as a symbol based on the number of zero crossings in the sequence. For hard chip correlation, the hard chip correlator 105 may determine the sign of $z_k$ for each chip k, and then perform correlation of this sign signal with a reference sequence b(j, k) for j∈{0, 1, . . . , 15}:

$$\hat{c}_H(t) = SymbolToChip\left(\underset{j \in \{0,1,\ldots,15\}}{\operatorname{argmin}}\left(\sum_k |b(j,k) - \operatorname{sign}(z_k)|\right)\right)$$

In other words, the chip correlator 105 finds a closest match among a plurality of reference sequences b(j, k) to zero crossings of the sequence of pulses (e.g., based on a minimum sum of differences), and the symbol selector 106 selects the symbol corresponding to the closest match reference sequence b(j, k).

The difference between the soft chip correlator and the hard chip correlator is that the value $z_k$, which contains the soft information of zero crossing counts of the chip sequence, is used for correlation:

$$\hat{c}_S(t) = SymbolToChip\left(\underset{j \in \{0,1,\ldots,15\}}{\operatorname{argmin}}\left(\sum_k \left|b(j,k) - \frac{z_k}{a}\right|\right)\right)$$

The design parameter a is the normalization factor. For an oversampling rate of 32 MHz and M=8 phase axis, α=4 may be a good candidate.

A TO tracker 107 receives the output $z_k$, which is the zero-crossings count, from the zero-crossing counter 104 and the chip values $q_k$ of the decoded symbol from the symbol selector 106, and determines whether the sampling is early or late. In particular, the TO tracker 107 calculates a metric based on an accumulation of the number of zero crossings and corresponding chip values of the decoded symbol, and compares the metric to a predetermined threshold value. Based on the results of the comparison, the TO tracker 108 compensates a timing offset of the signal by causing a sampling unit 109 to sample the signal at an earlier interval or a later interval.

A FO tracker 108 also receives the output $z_k$ from the zero-crossing counter 104 and calculates a frequency offset based on an accumulation of the number of zero crossings. The FO tracker 108 compensates a frequency offset of the signal by causing the digital signal mixer 110 to increase or decrease the mixer frequency according to the calculated frequency offset.

Figure 2:
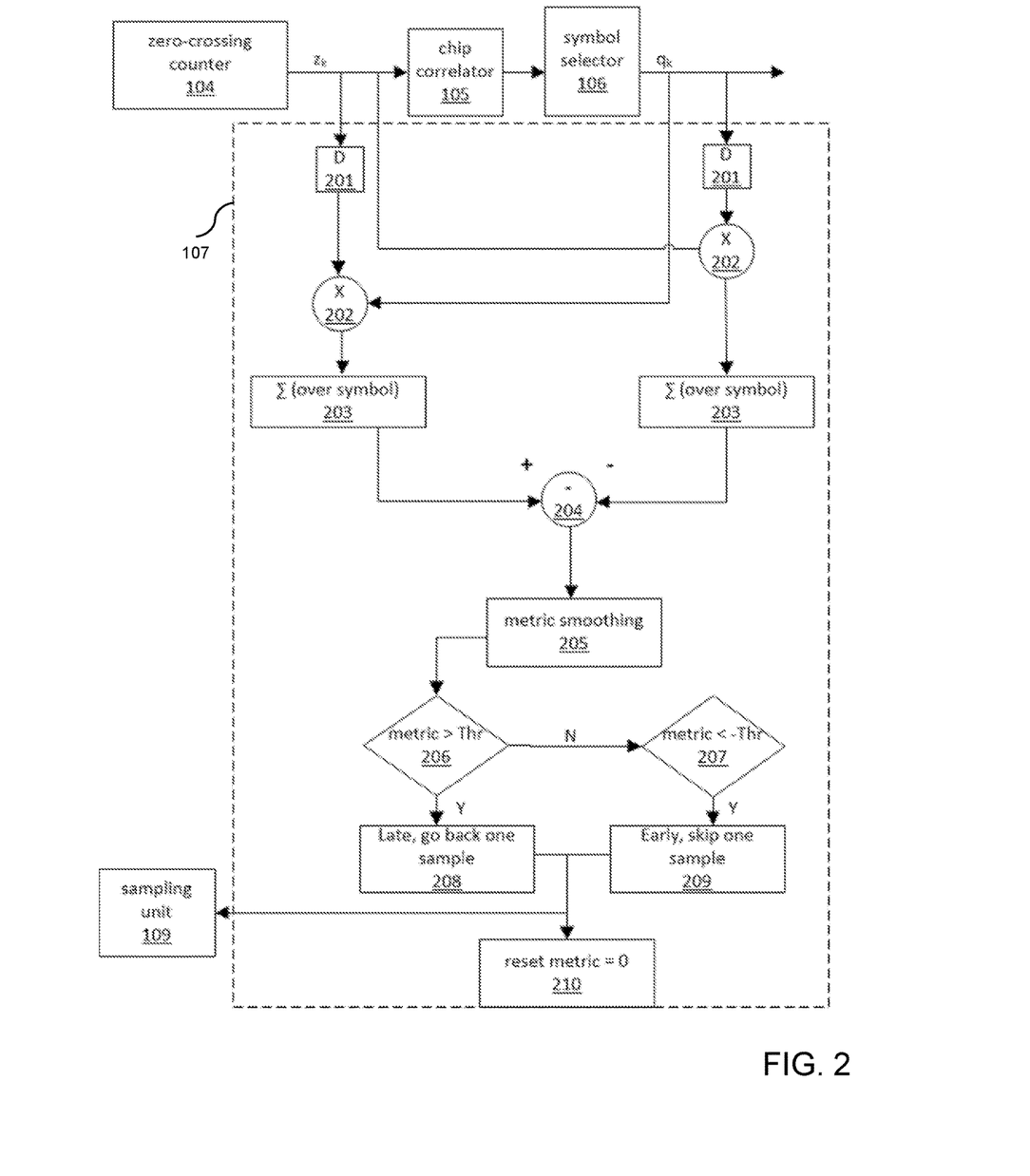
FIG. 2 illustrates an exemplary flowchart of the timing offset tracker, according to an embodiment.

FIG. 2 illustrates an exemplary flowchart of the timing offset tracker, according to an embodiment. The TO tracker 107 delays input values $z_k$ and $q_k$ through delay elements 201 (e.g., via flip flop) to generate values $z_{k-1}$ and $q_{k-1}$. The TO tracker 107 maintains an early correlation counter (ECC) by passing values $z_{k-1}$ and $q_k$ through a multiplier 202 and then accumulating the product via an accumulation unit 203. The TO tracker 107 also maintains a late correlation counter (LCC) by passing values $z_k$ and $q_{k-1}$ through a multiplier 202 and then accumulating the product via an accumulation unit 203. The ECC and LCC may be mathematically represented as:

$$ECC = \sum_{k=1}^{L-2} z_{k-1} q_k$$

$$LCC = \sum_{k=1}^{L-2} z_k q_{k-1}$$

where k represents a chip index of a corresponding chip in the decoded sequence of chips, L represents the number of chips per symbol, z represents the number of zero crossings of a corresponding chip, and q represents a chip value, +1 or −1, of a corresponding chip in the decoded symbol.

The TO tracker 107 calculates a metric by subtracting the LCC value from the ECC value via a subtraction unit 204:

metric=ECC−LCC

The TO tracker 107 may smooth the metric, for example, via an infinite impulse response (IIR) filter 205. The TO tracker 107 compares the metric to a predefined threshold Thr via comparators 206 and 207. If the value of the metric exceeds the value of Thr such that metric>Thr (at 206), the TO tracker 107 may determine that the sampling is late and trigger the timing adjustment go back one sample (at 208). For example, the TO tracker 107 may adjust the sampling unit 109 to sample the signal at an earlier interval. If the value of the metric exceeds the value of Thr in the opposite direction such that metric<−Thr, the TO tracker 107 may determine that the sampling is early and trigger the timing adjustment to skip one sample (at 209). For example, the TO tracker 107 may adjust the sampling unit 109 to sample the signal at a later interval. The metric is reset to zero after an adjustment (at 210). Accordingly, if the metric exceeds a specific threshold value, the present system declares an early or late event.

Figure 3:
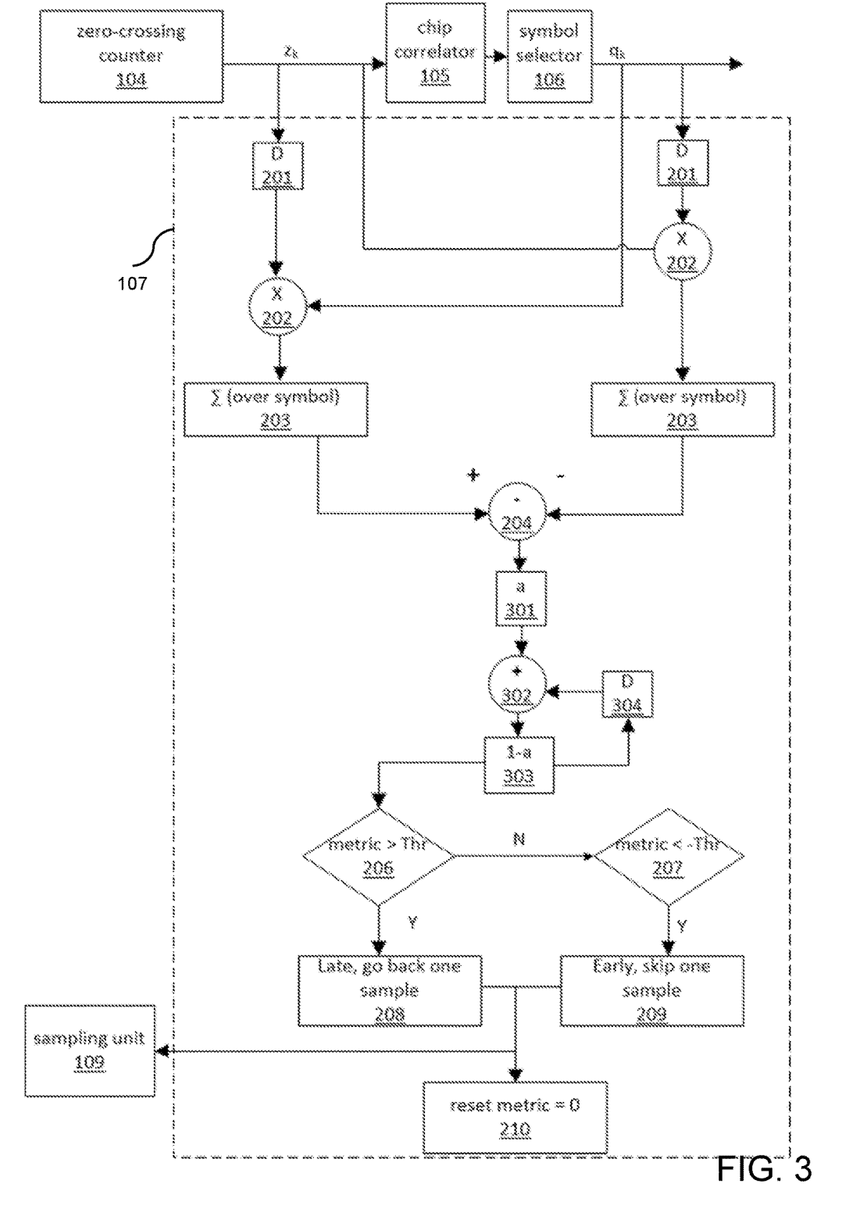
FIG. 3 illustrates an exemplary flowchart of the timing offset tracker, according to another embodiment.

FIG. 3 illustrates an exemplary flowchart of the timing offset tracker, according to another embodiment. The embodiment of FIG. 3 is substantially similar to that of FIG. 2 but differs in that the TO tracker 107 includes additional elements 301, 302, 303 and 304, and calculates the metric as a weighted sum:

metric=(1−α)$M_{prev}$+α(ECC−LCC), where $M_{prev}$ is the metric for the previously decoded symbol and a is a weight value ∈0≤α≤1.

The ECC equation may be derived by letting $\bar{q}_k$ be the actual k-th chip output and making the following two assumptions:
(A1) Chip-correlation output is error-free (i.e., $q_k = \bar{q}_k$)
(A2) Within a symbol, the instance of $\bar{q}_k = \bar{q}_{k+1}$ and $\bar{q}_k \neq \bar{q}_{k+1}$ are equally distributed.

If sampling is late, and $\bar{q}_k \neq \bar{q}_{k+1}$, then $|z_k|$ should be smaller than ideal due to incorrect sampling. If $\bar{q}_k = \bar{q}_{k+1}$, then $|z_k|$ should be unaffected by sampling error. Thus, the amount of offset away from the ideal sampling position can be modeled as:

$$ECC = \frac{1}{2}\left[\frac{\sum_{k=0}^{L-3}|z_k|I\{\bar{q}_k = \bar{q}_{k+1}\}}{\sum_{k=0}^{L-3}I\{\bar{q}_k = \bar{q}_{k+1}\}} - \frac{\sum_{k=0}^{L-3}|z_k|I\{\bar{q}_k \neq \bar{q}_{k+1}\}}{\sum_{k=0}^{L-3}I\{\bar{q}_k \neq \bar{q}_{k+1}\}}\right]$$

where I(x) is an indicator function that has value of 1 if condition is true and 0 otherwise. L=32 is the length of a symbol in chips. With (A1), $|z_k|=z_k\bar{q}_k$, the indicator function may be replaced by:

$$I\{\bar{q}_k = \bar{q}_{k+1}\} = \frac{1+\bar{q}_k\bar{q}_{k+1}}{2},$$

$$I\{\bar{q}_k \neq \bar{q}_{k+1}\} = \frac{1-\bar{q}_k\bar{q}_{k+1}}{2}$$

With (A2), $$\sum_{k=0}^{L-3} I\{\bar{q}_k = \bar{q}_{k+1}\} = \sum_{k=0}^{L-3} I\{\bar{q}_k \neq \bar{q}_{k+1}\} = \frac{L-2}{2}.$$

By applying the identities on ECC, the following is derived:

$$\frac{\sum_{k=0}^{L-3}|z_k|(I\{\bar{q}_k = \bar{q}_{k+1}\} - I\{\bar{q}_k \neq \bar{q}_{k+1}\})}{L-2} = \frac{\sum_{k=0}^{L-3}|z_k|\bar{q}_k\bar{q}_{k+1}}{L-2} = \frac{1}{L-2}\sum_{k=0}^{L-3} z_k \bar{q}_{k+1}$$

which is the same as the present metric. A similar derivation may be performed for LCC.

Figure 4:
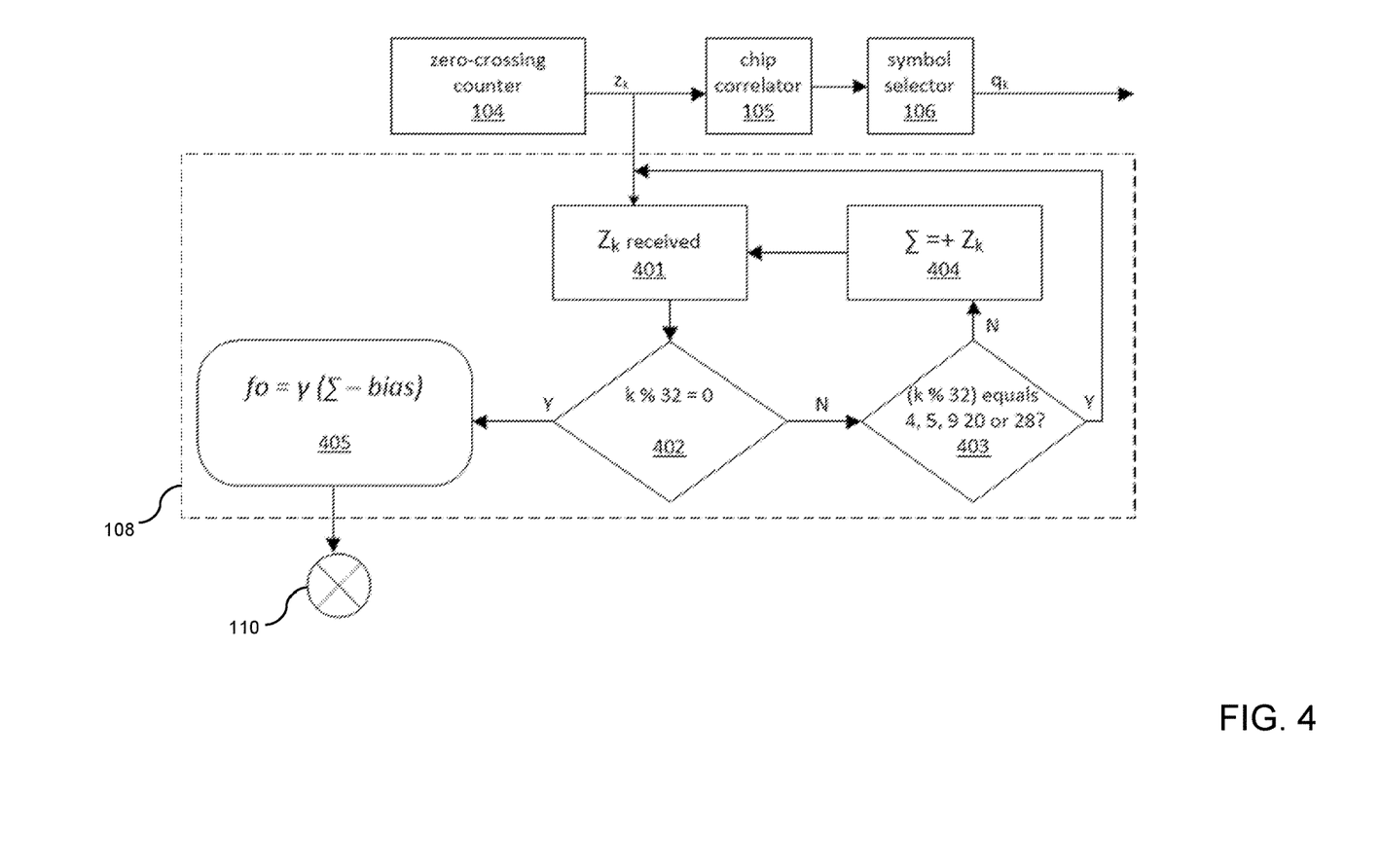
FIG. 4 illustrates an exemplary flowchart of the frequency offset tracker, according to an embodiment.

FIG. 4 illustrates an exemplary flowchart of the frequency offset tracker, according to an embodiment. The FO tracker 108 receives the zero-crossing count $z_k$ (at 401). The FO tracker 108 determines whether $z_k$ corresponds to the end of a symbol by performing modulo of the index k with the symbol length L (at 402). In this case, L=32, and the FO tracker 108 determines whether k % 32=0. If k % 32≠0, the FO tracker 108 further determines whether k % 32=any of {4, 5, 9, 20 and 28} (at 403). If k % 32=any of {4, 5, 9, 20 and 28}, the FO tracker 108 proceeds back to 401 to analyze the next value $z_{k+1}$. If k % 32≠any of {4, 5, 9, 20 and 28}, the FO tracker 108 accumulates $z_k$ as a sum $\Sigma Z_K$ (at 404) and then proceeds back 401 to analyze the next value $z_{k+1}$.

When the FO tracker 108 determines that the end of the symbol is reached (i.e., k % 32=0), the FO tracker proceeds to 405 to calculate the frequency offset estimate $\hat{f}_o$ as:

$$\hat{f}_o = \gamma\left[\left(\sum_{k=1}^{L} I_k z_k\right) - \text{bias}\right]$$

where k represents a chip index of a corresponding chip in the decoded sequence of chips, L represents a number of chips per symbol, z represents the number of zero crossings of a corresponding chip, I represents an indicator function having a value of 0 or 1 according to k, and bias and γ represent design parameters. In the case shown, $I_k$=0 for k∈{0, 4, 5, 9, 20 and 28} and $I_k$=0 otherwise.

In other words, the FO tracker 108 calculates the frequency offset estimate $\hat{f}_o$ based on an accumulation of the number of zero crossings. In this case, the FO tracker 108 accumulates the number of zero crossings over only a subset of the chips per symbol, as provided by the indicator function $I_k$. The digital signal mixer 110 may receive the frequency offset estimate $\hat{f}_o$ and increase or decrease the mixer frequency according to the frequency offset estimate $\hat{f}_o$.

The above frequency offset estimate $\hat{f}_o$ may be derived by taking advantage of a special property of the reference sequences b(j, k) in which:

$$\sum_{\substack{k \\ k \notin \{0,4,5,9,20,28\}}} b(j,k) = \begin{cases} 1, & j \in \{0, 1, \ldots, 7\} \\ -1, & j \in \{8, 9, \ldots, 15\} \end{cases}$$

where j represents a symbol index and k represents a value index in the reference sequence. When the frequency offset is zero, the signal $z_k$ is a scaled version of the transmitted sequence, which should correspond to one of the reference sequences b(j, k):

$$z_k = C \cdot b(j,k) + \gamma \cdot f_o$$

where C is a constant representing the maximum zero-crossing counter output, b(j, k) is the reference sequence associated with transmitted symbol j, $f_o$ is the frequency offset and the constant γ is the scaling factor.

Then, by applying the special property of the reference sequences b(j, k), a truncated sum for estimating the frequency offset is provided as:

$$\hat{f}_o = \frac{1}{26 \cdot \gamma} \times \sum_{\substack{k \\ k \notin \{0,4,5,9,20,28\}}} z_k$$

An estimation bias removal term may be further subtracted from the frequency offset estimate $\hat{f}_o$ in some embodiments.

The summation of the references sequences b(j, k) without truncation results in:

$$\left(\sum_k b(j,k)\right) \in \{\pm 3, \pm 5\}$$

Thus, by applying a specially designed indicator function $I_k$ that takes advantage of the above-discussed property of the reference sequences b(j, k), the present system and method provide an estimation error that is significantly reduced.

Accordingly, in view of the foregoing, embodiments of the present disclosure provide TO tracking and FO tracking by using zero crossings of decoded chips to accumulate a metric. For TO tracking, the present system further determines ECC and LCC values, and uses the difference between ECC and LCC values as a metric. Also, TO tracking as described herein may function with taking as little as one sample per chip and does not require knowledge of phase information. For FO tracking, the present system further provides bias removal, and calculates a frequency offset estimate by accumulating the zero crossings for only a subset of the chips per symbol, thereby significantly reducing an estimation error.

Various embodiments of the present system and method may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A receiver of modulated signals, the receiver comprising:
   a signal sampling unit configured to sample a signal;
   a zero-crossing demodulator including:
      a zero-crossing counter configured to determine a number of zero crossings for each pulse of the signal, and
      a symbol selector configured to decode a sequence of pulses as a symbol based on the number of zero crossings in the sequence of pulses; and
   a timing offset tracking unit configured to:
      calculate a metric based on an accumulation of the number of zero crossings and corresponding pulse values of the decoded symbol,
      compare the metric to a predetermined threshold value, and
      compensate a timing offset of the signal by causing the signal sampling unit to sample the signal at an earlier interval or a later interval in response to the comparison.

2. The receiver of claim 1, wherein the zero-crossing demodulator further comprises a pulse correlator configured to find a closest match among a plurality of reference sequences to zero crossings of the sequence of pulses, and
   the symbol selector is configured to select the symbol corresponding to the closest match reference sequence.

3. The receiver of claim 2, wherein to calculate the metric includes calculating an early correlation counter (ECC) as:

$$ECC = \sum_{k=1}^{L-2} z_{k-1} q_k,$$

where k represents a pulse index of a corresponding pulse in the decoded sequence of pulses, L represents the number of pulses in the symbol, z represents the number of zero crossings of a corresponding pulse, and q represents a pulse value, +1 or −1, of a corresponding pulse in the decoded symbol.

4. The receiver of claim 3, wherein to calculate the metric includes calculating a late correlation counter (LCC) as:

$$LCC = \sum_{k=1}^{L-2} z_k q_{k-1},$$

where k represents a pulse index of a corresponding pulse in the decoded sequence of pulses, L represents the number of pulses in the symbol, z represents the number of zero crossings of a corresponding pulse, and q represents a pulse value, +1 or −1, of a corresponding pulse in the decoded symbol.

5. The receiver of claim 4, wherein the metric is calculated as:

metric=$ECC-LCC$.

6. The receiver of claim 4, wherein the metric is calculated as a weighted sum:

metric=$(1-\alpha)M_{prev}+\alpha(ECC-LCC)$ where $M_{prev}$ is the metric for a previous symbol and a is a weight value $0 \le \alpha \le 1$.

7. The receiver of claim 4, wherein the timing offset tracking unit causes the sampling unit to sample the signal at an earlier interval in response to a comparison result in which:

metric>$Thr$ where Thr is the predetermined threshold value.

8. The receiver of claim 7, wherein the timing offset tracking unit causes the sampling unit to sample the signal at a later interval in response to a comparison result in which:

metric<−*Thr* where Thr is the predetermined threshold value.

9. The receiver of claim 7, wherein the zero-crossing demodulator further includes a phase axis generator configured to perform Park transformation on the signal to generate a plurality of transformed signals each with respect to a different set of phase axes.

10. The receiver of claim 9, wherein the number of zero crossings for each pulse is determined as a sum of zero crossings over the plurality of transformed signals.

11. The receiver of claim 1, wherein the receiver is a ZigBee compliant receiver.

12. A receiver of modulated signals, the receiver comprising:
a signal mixer configured to perform baseband down-conversion of a signal according to a mixer frequency;
a zero-crossing demodulator including:
a zero-crossing counter configured to determine a number of zero crossings for each pulse of the signal;
a symbol selector configured to decode a sequence of pulses as a symbol based on the number of zero crossings in the sequence of pulses, and
a phase axis generator configured to perform Park transformation on the signal to generate a plurality of transformed signals each with respect to a different set of phase axes; and
a frequency offset tracking unit configured to:
calculate a frequency offset based on an accumulation of the number of zero crossings, and
compensate a frequency offset of the signal by causing the signal mixer unit to increase or decrease the mixer frequency according to the calculated frequency offset.

13. The receiver of claim 12, wherein the frequency offset $\hat{f}_o$ is calculated as:

$$\hat{f}_o = \gamma \left[ \sum_{k=0}^{L-1} I_k z_k - \text{bias} \right],$$

where k represents a pulse index of a corresponding pulse in the decoded sequence of pulses, L represents a number of pulses per symbol, z represents the number of zero crossings of a corresponding pulse, I represents an indicator function having a value of 0 or 1 according to k, and bias and γ represent design parameters.

14. The receiver of claim 13, wherein $I_k=0$ for k∈{0, 4, 5, 9, 20, 28} and $I_k=1$ otherwise.

15. The receiver of claim 12, wherein the accumulation of the number of zero crossings is accumulated over only a subset of the pulses per symbol.

16. The receiver of claim 12, wherein the zero-crossing demodulator further comprises a pulse correlator configured to find a closest match among a plurality of reference sequences to zero crossings of the sequence of pulses, and the symbol selector is configured to select the symbol corresponding to the closest match reference sequence.

17. The receiver of claim 16, wherein there are sixteen reference sequences b(j,k) for j∈{0, . . . , 15}, and the reference sequences have the following property:

$$\sum_{k \notin \{0,4,5,9,20,28\}} b(j,k) = \begin{cases} 1, & j \in \{0, 1, \ldots, 7\} \\ -1, & j \in \{8, 9, \ldots, 15\} \end{cases}$$

where j represents a symbol index and k represents a value index in a reference sequence.

18. The receiver of claim 12, wherein the number of zero crossings for each pulse is determined as a sum of zero crossings over the plurality of transformed signals.

19. The receiver of claim 12, wherein the receiver is a ZigBee compliant receiver.

20. A receiver of modulated signals, the receiver comprising:
a signal mixer configured to perform baseband down-conversion of a signal according to a mixer frequency;
a zero-crossing demodulator including:
a zero-crossing counter configured to determine a number of zero crossings for each pulse of the signal, and
a symbol selector configured to decode a sequence of pulses as a symbol based on the number of zero crossings in the sequence of pulses; and
a frequency offset tracking unit configured to:
calculate a frequency offset based on an accumulation of the number of zero crossings, and
compensate a frequency offset of the signal by causing the signal mixer unit to increase or decrease the mixer frequency according to the calculated frequency offset,
wherein the frequency offset $\hat{f}_o$ is calculated as:

$$\hat{f}_o = \gamma \left[ \sum_{k=0}^{L-1} I_k z_k - \text{bias} \right],$$

where k represents a pulse index of a corresponding pulse in the decoded sequence of pulses, L represents a number of pulses per symbol, z represents the number of zero crossings of a corresponding pulse, I represents an indicator function having a value of 0 or 1 according to k, and bias and γ represent design parameters.

* * * * *